US012767677B2

(12) United States Patent
Yue et al.

(10) Patent No.: US 12,767,677 B2
(45) Date of Patent: Oct. 20, 2026

(54) LITHIUM DIFLUORO-BIS(OXALATE)PHOSPHATE, PREPARATION METHOD THEREFOR, AND APPLICATION THEREOF

(71) Applicant: SHENZHEN YANYI NEW MATERIALS CO., LTD., Guangdong (CN)

(72) Inventors: Min Yue, Guangdong (CN); Yi Yu, Guangdong (CN)

(73) Assignee: SHENZHEN YANYI NEW MATERIALS CO., LTD., Guangdong (CN)

(*) Notice: Subject to any disclaimer, the term of this patent is extended or adjusted under 35 U.S.C. 154(b) by 362 days.

(21) Appl. No.: 18/564,806

(22) PCT Filed: May 20, 2022

(86) PCT No.: PCT/CN2022/094100
§ 371 (c)(1),
(2) Date: Nov. 28, 2023

(87) PCT Pub. No.: WO2022/253007
PCT Pub. Date: Dec. 8, 2022

(65) Prior Publication Data
US 2024/0279259 A1 Aug. 22, 2024

(30) Foreign Application Priority Data
May 31, 2021 (CN) ......................... 202110598341.3

(51) Int. Cl.
*H01M 10/0525* (2010.01)
*C07F 9/6574* (2006.01)
*H01M 10/0568* (2010.01)

(52) U.S. Cl.
CPC ..... *C07F 9/65748* (2013.01); *H01M 10/0525* (2013.01); *H01M 10/0568* (2013.01); *H01M 2300/0028* (2013.01)

(58) Field of Classification Search
CPC ........... C07F 9/65748; H01M 10/0525; H01M 10/0568
See application file for complete search history.

(56) References Cited

FOREIGN PATENT DOCUMENTS

| | | | | |
|---|---|---|---|---|
| CN | 101453037 | | 4/2011 | |
| CN | 109485671 A | | 3/2019 | |
| CN | 110204576 | | 9/2019 | |
| CN | 110204576 A | * | 9/2019 | .......... C07F 9/65748 |
| CN | 110845539 | | 2/2020 | |
| CN | 110845539 A | | 2/2020 | |
| CN | 111004286 | | 4/2020 | |
| CN | 111004286 A | | 4/2020 | |
| CN | 111116349 A | | 5/2020 | |
| CN | 113336793 A | | 9/2021 | |
| EP | 2857406 B1 | * | 8/2017 | ........ H01M 10/0568 |
| WO | WO-2013187380 A1 | * | 12/2013 | ........ H01M 10/0568 |

OTHER PUBLICATIONS

Japanese Office Action dated Nov. 7, 2024 from corresponding Japanese Application No. 2023-568733 with English translation.
English translation of International Search Report from corresponding International Application PCT/CN2022/094100 dated Jul. 25, 2022.
Machine translation of First Office Action dated Feb. 18, 2023 from corresponding Chinese Application 202110598341.3.
A Review of Synthetic Routes of Lithium Difluorobis(oxalato)phosphate, Shen Fang-lie et al., Zhejiang Chemical Industry vol. 51 No. 8 2020)—English Abstract.

* cited by examiner

*Primary Examiner* — Jared Barsky
(74) *Attorney, Agent, or Firm* — Ruggiero McAllister & McMahon LLC; Edward L McMahon

(57) ABSTRACT

Disclosed are lithium difluoro-bis(oxalate)phosphate, a preparation method therefor, and an application thereof. The preparation method comprises the following steps: (1) mixing oxalyl chloride and lithium hexafluorophosphate with a nonaqueous solvent, adding siloxane, and reacting to obtain a lithium difluoro-bis(oxalate)phosphate solution; and (2) adding a poor solvent into the lithium difluoro-bis(oxalate) phosphate solution for crystallization treatment to obtain the lithium difluoro-bis(oxalate)phosphate. According to the present application, raw materials such as lithium hexafluorophosphate, oxalyl chloride, and hexamethyldisiloxane are used for preparing the difluoro-bis(oxalate)phosphate, and the method of the present application is few in side reaction, few in impurities, high in product purity, and suitable for industrial production.

20 Claims, No Drawings

LITHIUM DIFLUORO-BIS(OXALATE)PHOSPHATE, PREPARATION METHOD THEREFOR, AND APPLICATION THEREOF

TECHNICAL FIELD

Embodiments of the present application relate to the technical field of chemical synthesis, for example, a lithium difluorobis(oxalato)phosphate, a preparation method therefor and an application thereof.

BACKGROUND

Lithium-ion battery is mainly composed of a positive electrode, a negative electrode, a separator and an electrolyte solution. The electrolyte solution, which is mainly composed of electrolyte and an organic solvent, is an active component connecting the positive electrode and negative electrode, and an important factor affecting battery performance. In addition to the electrolyte and organic solvent, the electrolyte additive is the most important component in lithium-ion battery electrolyte solution, and appropriate additives can play a key role in enhancing the lithium battery performance. Lithium difluorobis(oxalato)phosphate is mainly used in the nonaqueous electrolyte solution of lithium-ion batteries and lithium-ion capacitors. Lithium difluorobis(oxalato)phosphate can enhance the high temperature resistance of the electrolyte solution, and form a more stable solid electrolyte interface film (SEI film) on the positive material, improving the circulating charge and discharge performance of the battery.

At present, in the disclosed methods for preparing lithium difluorobis(oxalato)phosphate, most of the preparation methods use lithium hexafluorophosphate and silicon tetrachloride as raw materials to prepare lithium difluorobis(oxalato)phosphate. However, during the reaction process, lithium hexafluorophosphate is easy to be partially decomposed into phosphorus pentafluoride, or reacts with other oxygen-containing substances to produce lithium difluorophosphate, and the removal of impurity is difficult. Meanwhile, during the reaction process using silicon-based auxiliaries, a large amount of silicon tetrafluoride and hydrogen chloride gas will be produced, which is difficult to separate and use, and the safety risk of the technical solution is high, resulting in great industrialization difficulties.

CN102216311B discloses a method for manufacturing a lithium difluorobis(oxalato)phosphate solution, which uses hexafluorophosphoric acid, lithium oxalate and silicon tetrachloride as raw materials to prepare lithium difluorobis(oxalato)phosphate, and this method will produce a large amount of hydrogen chloride and silicon fluoride. These highly corrosive acid gases have very high requirements for the equipment and are difficult to separate from the product, and it is difficult to control the chloride ion content and acid value of the product. This method has hidden dangers and risks in safety and reliability.

CN111690010A discloses a method for preparing lithium tetrafluoro(oxalato)phosphate and lithium difluorobis(oxalato)phosphate, which uses lithium hexafluorophosphate, oxalic acid and silazane to prepare lithium difluorobis(oxalato)phosphate. The method produces ammonia gas and fluorosilane that are difficult to separate, and the post-treatment is complicated and a large amount of three wastes is produced, which is not conducive to industrial production.

The above solutions have the problems such as low safety, poor reliability or a large amount of three wastes, which is not conducive to industrial production. Therefore, it is necessary to develop a method for preparing lithium difluorobis(oxalato)phosphate, which is highly safe and reliable, environmentally friendly and conducive to industrial production.

SUMMARY

The following is a summary of the subject described in detail in present application. This summary is not intended to limit the protection scope of the claims.

An embodiment in the present application provides a lithium difluorobis(oxalato)phosphate, a preparation method therefor and an application thereof, and the preparation method comprises the following steps: (1) mixing oxalyl chloride and lithium hexafluorophosphate with a nonaqueous solvent, adding siloxane, and reacting to obtain a lithium difluorobis(oxalato)phosphate solution; and (2) adding a poor solvent into the lithium difluorobis(oxalato)phosphate solution for crystallization to obtain the lithium difluorobis(oxalato)phosphate. The present application uses raw materials such as lithium hexafluorophosphate, oxalyl chloride, and hexamethyldisiloxane to prepare difluorobis(oxalato)phosphate salt. The method in present application has few side reaction, little impurity, high product purity, and facilitates the realization of industrial production.

In a first aspect, an example in the present application provides a method for preparing lithium difluorobis(oxalato)phosphate, and the preparation method comprises the following steps:

(1) mixing oxalyl chloride and lithium hexafluorophosphate with a nonaqueous solvent, adding siloxane, and reacting to obtain a lithium difluorobis(oxalato)phosphate solution; and (2) adding a poor solvent into the lithium difluorobis(oxalato)phosphate solution for crystallization to obtain the lithium difluorobis(oxalato)phosphate.

The present application uses raw materials such as lithium hexafluorophosphate, oxalyl chloride, and hexamethyldisiloxane to prepare difluorobis(oxalato)phosphate salt. Compared with other relevant methods, the method in present application has few side reaction, little impurity, high product purity, and facilitates the realization of industrial production. The process of the reaction is as follows:

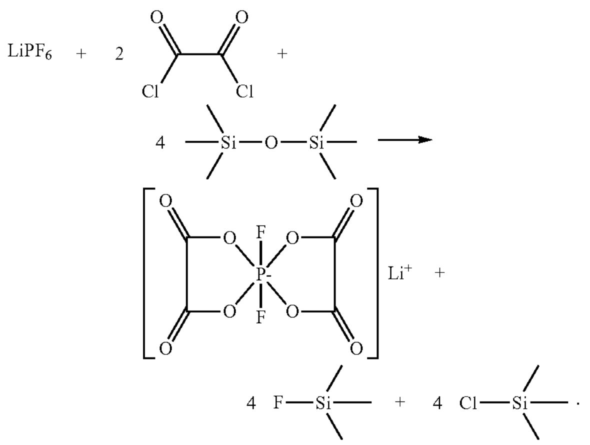

In this reaction, siloxane can bind strongly to fluorine atoms in lithium hexafluorophosphate, and provide oxygen atoms for the formation of lithium difluorobis(oxalato)

phosphate without generating waste gas such as ammonia gas, and three wastes are less.

Preferably, the nonaqueous solvent in step (1) comprises any one or a combination of at least two of dimethyl carbonate, diethyl carbonate, methyl ethyl carbonate, ethylene glycol dimethyl ether, ethyl acetate or acetonitrile.

Preferably, a purity of the nonaqueous solvent in step (1) is more than 99.9%, for example, 99.9%, 99.92%, 99.95%, 99.98% or 100%, etc.

Preferably, a moisture content of the nonaqueous solvent in step (1) is less than 10 ppm, for example, 1 ppm, 2 ppm, 3 ppm, 4 ppm, 5 ppm, 7 ppm or 9 ppm, etc.

When the purity of the nonaqueous solvent is less than 99.9%, too many impurities are brought, which leads to a decline in the purity of the product; when the moisture content of the nonaqueous solvent is more than 10 ppm, lithium hexafluorophosphate will be partially decomposed, increasing the acid value and reducing the yield.

Preferably, the nonaqueous solvent and the lithium hexafluorophosphate in step (1) have a mass ratio of is (10-20):1, for example, 10:1, 12:1, 15:1, 18:1 or 20:1, etc.

Preferably, the siloxane in step (1) comprises any one or a combination of at least two of hexamethyldisiloxane, hexaethyldisiloxane, difluorotetramethyldisiloxane, difluorotetraethyldisiloxane, dichlorotetramethyldisiloxane, or dichlorotetraethyldisiloxane.

Preferably, the siloxane is added in manner of dropwise adding.

Slowly dropwise adding siloxane and stirring can prevent from violently producing gas in the present application.

Preferably, the lithium hexafluorophosphate, the oxalyl chloride and the siloxane in step (1) have a molar ratio of 1:(2.0-2.4):(4.0-4.5), for example, 1:2:4, 1:2.2:4, 1:2.3:4.4, 1:2.1:4.3, 1:2.3:4.5 or 1:2.4:4.5, etc.

The lithium difluorobis(oxalato)phosphate with good performance can be prepared by controlling the molar ratio of lithium hexafluorophosphate, oxalyl chloride and siloxane in the above range. When the molar amount of lithium hexafluorophosphate is 1.0 mol, if the molar amount of oxalyl chloride is less than 2.0 mol, lithium hexafluorophosphate reacts incompletely, the high price of lithium hexafluorophosphate leads to high preparation cost, and lithium hexafluorophosphate is difficult to remove and may be decomposed to produce impurities; if the molar amount of oxaloyl chloride is more than 2.4 mol, the amount of oxalyl chloride is too much and difficult to remove, affecting the purity of the product; if the molar amount of siloxane is less than 4.0 mol, lithium hexafluorophosphate and oxalyl chloride are excessive, increasing the preparation cost and reducing the purity of the product; if the molar amount of siloxane is more than 4.5 mol, siloxane is excessive, and the reaction yield does not further increase.

Preferably, the reacting in step (1) comprises stirring.

Preferably, a temperature of the reacting is 30-60° C., for example, 30° C., 35° C., 40° C., 45° C., 50° C., 55° C. or 60° C., etc.

Preferably, a time of the reacting is 6-12 h, for example, 6 h, 7 h, 8 h, 9 h, 10 h, 11 h or 12 h, etc.

If the reaction temperature is lower than 30° C., the reaction is incomplete, and the conversion rate is low, affecting the yield and purity of the product; if the reaction temperature is higher than 60° C., it leads to the accelerated decomposition of lithium hexafluorophosphate to produce phosphorus pentafluoride and hydrogen fluoride, increasing the acid value of the product and side reactions. If the reaction time is less than 6 h, the reaction is incomplete, and if the reaction time is more than 12 h, the reaction yield does not further increase, resulting in higher cost.

Preferably, the mixing in step (1) is performed under an inert atmosphere.

Preferably, both step (1) and step (2) are performed under an inert atmosphere.

Preferably, a gas in the inert atmosphere comprises at least one of nitrogen, helium, neon and argon.

Preferably, the inert atmosphere has a moisture content of less than 10 ppm, for example, 1 ppm, 2 ppm, 3 ppm, 4 ppm, 5 ppm, 7 ppm or 9 ppm, etc.

The lower the moisture content of the inert atmosphere, the better, when the moisture content is higher than 10 ppm, it is easy to react with lithium hexafluorophosphate, increasing the acid value and reducing the yield.

Preferably, the poor solvent of step (2) comprises any one or a combination of at least two of n-hexane, dichloromethane, 1,2-dichloroethane, toluene or ethylbenzene.

Preferably, the poor solvent and the lithium hexafluorophosphate have a mass ratio of (8-30):1, for example, 8:1, 10:1, 15:1, 20:1, 25:1 or 30:1, etc.

When the mass ratio of the poor solvent to the lithium hexafluorophosphate is lower than 8:1, the crystallization of lithium difluorobis(oxalato)phosphate in the concentrated solution is incomplete, reducing the yield of the product; when the mass ratio of the poor solvent to the lithium hexafluorophosphate is higher than 30:1, the poor solvent is excessive, increasing the cost, but the yield does not increase further.

Preferably, the lithium difluorobis(oxalato)phosphate solution is filtered after step (1) and before the crystallization in step (2).

Preferably, filtration, washing, and drying are performed after the crystallization in step (2).

Preferably, the drying comprises vacuum drying.

Preferably, a temperature of the drying is 40-120° C., for example, 40° C., 50° C., 80° C., 100° C. or 120° C., etc., preferably 60-100° C.

Preferably, a time of the drying is 2-12 h, for example, 2 h, 5 h, 8 h, 10 h or 12 h, etc., preferably 4-8 h.

When the drying temperature is too low, the drying is incomplete, and the residual raw materials, moisture and solvents cannot be removed; when the drying temperature is too high, the product will be partially decomposed under the high temperature condition. When the drying time is too short, the drying is incomplete, and the residual raw materials, moisture and solvents cannot be removed; when the drying time is too long, the moisture content will not be further reduced, but the preparation cost will increase.

In a second aspect, an embodiment in the present application provides a lithium difluorobis(oxalato)phosphate, and the lithium difluorobis(oxalato)phosphate is prepared by the method according to the first aspect.

Preferably, the lithium difluorobis(oxalato)phosphate has a chloride ion content of 0-5 ppm, for example, 1 ppm, 2 ppm, 3 ppm, 4 ppm or 5 ppm, etc.

Preferably, the lithium difluorobis(oxalato)phosphate has a metal impurity ion content of 0-10 ppm, for example, 1 ppm, 2 ppm, 3 ppm, 4 ppm, 5 ppm, 7 ppm or 9 ppm, etc.

Preferably, the lithium difluorobis(oxalato)phosphate has a moisture content of is 0-10 ppm, for example, 1 ppm, 3 ppm, 5 ppm, 8 ppm or 10 ppm, etc., preferably less than or equal to 7.5 ppm.

Preferably, the lithium difluorobis(oxalato)phosphate has an acid value of 0-10 ppm, for example, 1 ppm, 2 ppm, 3 ppm, 4 ppm, 5 ppm, 7 ppm or 9 ppm, etc.

Preferably, a purity of the lithium difluorobis(oxalato) phosphate is more than or equal to 99.9%, for example, 99.9%, 99.92%, 99.95%, 99.98% or 100%, etc.

In a third aspect, an embodiment in the present application provides an electrolyte, and the electrolyte comprises the lithium difluorobis(oxalato)phosphate according to the second aspect.

In a fourth aspect, an embodiment in the present application further provides a lithium-ion battery, and the lithium-ion battery comprises the electrolyte according to the third aspect.

Compared with the related art, the embodiments of the present application has the beneficial effects described below.

(1) The method in the embodiments of the present application uses cheap raw materials to prepare lithium difluorobis(oxalato)phosphate, and the method has a simple and convenient operation, few reaction step and little impurity, which avoids the defects of other methods such as complex operation and many impurities in the product, and ensures the purity and quality of the product, and the method can obtain the high-quality and high-purity product, which is suitable for industrial production.

(2) the yield of the lithium difluorobis(oxalato)phosphate obtained by the method in the embodiments of the present application can be more than or equal to 89.2%, the purity of the lithium difluorobis(oxalato)phosphate obtained by the method in the examples of the present application can be more than or equal to 99.55%, the moisture content of the product can be less than or equal to 19 ppm, the content of free acid can be less than or equal to 22.1 ppm, and the chloride ion content can be less than or equal to 30.2 ppm, and the metal impurity ion content can be less than or equal to 10.8 ppm; by adjusting each component proportion and reaction conditions, the yield of the prepared lithium difluorobis(oxalato)phosphate can be more than or equal to 91.5%, the purity can be more than or equal to 99.94%, the moisture content of the product can less than or equal to 7.5 ppm, the content of free acid can be less than or equal to 8.8 ppm, and the chloride ion content can be less than or equal to 4.8 ppm, and the metal impurity ion content can be less than or equal to 8.9 ppm.

After reading and understanding the detailed descriptions, other aspects can be understood.

DETAILED DESCRIPTION

The technical solution of the present application is further illustrated by the embodiments below. It should be understood by those skilled in the art that the examples are only to help understand the present application, and should not be regarded as a specific limitation of the present application.

Raw materials or reagents used in the examples and comparative examples of the present application are purchased from mainstream manufacturers in the market, and those whose manufacturer or concentration have not been indicated are all analytical grade raw materials or reagents that can be routinely obtained, as long as they can play the expected role, there are no special restrictions. Instruments and equipment such as gloveboxes used in the examples and comparative examples of the present application are purchased from major manufacturers in the market, as long as they can play the expected role, there are no special restrictions. Specific techniques or conditions without indicating in the examples and comparative examples of the present application are carried out according to the techniques or conditions described in the document of the field or the product manuals.

Example 1

This example provides a lithium difluorobis(oxalato) phosphate, and a method for preparing the lithium difluorobis(oxalato)phosphate is as follows:

(1) in a glovebox with nitrogen atmosphere and a moisture content less than 10 ppm, 250 g of dimethyl carbonate that was dehydrated to 8 ppm was added to a three-necked reaction flask, and 15.19 g of lithium hexafluorophosphate (0.1 mol) and 25.38 g of oxalyl chloride (0.2 mol) were simultaneously added; the three-necked reaction flask was taken out from the glovebox, placed on a constant temperature magnetic stirring device, and heated to 30° C.; 64.95 g of hexamethyldisiloxane (0.4 mol) was dropwise added to the three-necked reaction flask by a constant pressure dropping funnel, where lithium hexafluorophosphate, oxalyl chloride and hexamethyldisiloxane had a molar ratio of 1:2:4; the mixture was fully stirred for reaction, a trimethylfluorosilane gas produced during the reaction was introduced into an alkali solution such as potassium hydroxide solution for absorption, the reaction was completed after 6 h to obtain a lithium difluorobis(oxalato)phosphate solution; and (2) the reaction solution was filtered, the filtrate was concentrated under reduced pressure, most of the solvent and trimethylchlorosilane were removed, the obtained concentrated solution was added with 150 g of dichloromethane for crystallization, and filtered, the product was washed twice with 50 g of dichloromethane, and dried at 60° C. for 8 h under a relative vacuum of −0.09 MPa, and 23.13 g of the product lithium difluorobis(oxalato)phosphate (0.0918 mol) was obtained and the yield was 91.8%.

Example 2

This example provides a lithium difluorobis(oxalato) phosphate, and a method for preparing the lithium difluorobis(oxalato)phosphate is as follows:

(1) in a glovebox with nitrogen atmosphere and a moisture content less than 10 ppm, 152 g of diethyl carbonate that was dehydrated to 7 ppm was added to a three-necked reaction flask, and 15.19 g of lithium hexafluorophosphate (0.1 mol) and 30.46 g of oxalyl chloride (0.24 mol) were simultaneously added; the three-necked reaction flask was taken out from the glovebox, placed on a constant temperature magnetic stirring device, and heated to 60° C.; 73.07 g of hexamethyldisiloxane (0.45 mol) was dropwise added to the three-necked reaction flask by a constant pressure dropping funnel, where lithium hexafluorophosphate, oxalyl chloride and hexamethyldisiloxane had a molar ratio of 1:2.4:4.5; the mixture was fully stirred for reaction, a trimethylfluorosilane gas produced during the reaction was introduced into an alkali solution such as potassium hydroxide solution for absorption, the reaction was completed after 12 h to obtain a lithium difluorobis(oxalato)phosphate solution; and (2) the reaction solution was filtered, the filtrate was concentrated under reduced pressure, most of the solvent and trimethylchlorosilane were removed, the obtained concentrated solution was added with 300 g of 1,2-dichloroethane for crystallization, and filtered, the product was washed twice with 80 g of 1,2-dichloroethane, and dried at 100° C. for 4 h under a relative vacuum of −0.08 MPa, and 23.60 g of the product lithium difluorobis(oxalato)phosphate (0.0937 mol) was obtained and the yield was 93.7%.

Example 3

This example provides a lithium difluorobis(oxalato) phosphate, and a method for preparing the lithium difluorobis(oxalato)phosphate is as follows:

(1) in a glovebox with nitrogen atmosphere and a moisture content less than 10 ppm, 300 g of methyl ethyl carbonate that was dehydrated to 6 ppm was added to a three-necked reaction flask, and 15.19 g of lithium hexafluorophosphate (0.1 mol) and 27.92 g of oxalyl chloride (0.22 mol) were simultaneously added; the three-necked reaction flask was taken out from the glovebox, placed on a constant temperature magnetic stirring device, and heated to 40° C.; 68.20 g of hexamethyldisiloxane (0.42 mol) was dropwise added to the three-necked reaction flask by a constant pressure dropping funnel, where lithium hexafluorophosphate, oxalyl chloride and hexamethyldisiloxane had a molar ratio of 1:2.2:4.2; the mixture was fully stirred for reaction, a trimethylfluorosilane gas produced during the reaction was introduced into an alkali solution such as potassium hydroxide solution for absorption, the reaction was completed after 8 h to obtain a lithium difluorobis(oxalato)phosphate solution; and (2) the reaction solution was filtered, the filtrate was concentrated under reduced pressure, most of the solvent and trimethylchlorosilane were removed, the obtained concentrated solution was added with 160 g of dichloromethane for crystallization, and filtered, the product was washed twice with 60 g of dichloromethane, and dried at 70° C. for 7 h under a relative vacuum of −0.09 MPa, and 23.25 g of the product lithium difluorobis(oxalato)phosphate (0.0923 mol) was obtained and the yield was 92.3%.

Example 4

This example provides a lithium difluorobis(oxalato) phosphate, and a method for preparing the lithium difluorobis(oxalato)phosphate is as follows:

(1) in a glovebox with nitrogen atmosphere and a moisture content less than 10 ppm, 250 g of ethyl acetate that was dehydrated to 9 ppm was added to a three-necked reaction flask, and 15.19 g of lithium hexafluorophosphate (0.1 mol) and 25.38 g of oxalyl chloride (0.2 mol) were simultaneously added; the three-necked reaction flask was taken out from the glovebox, placed on a constant temperature magnetic stirring device, and heated to 50° C.; 106.01 g of hexaethyldisiloxane (0.43 mol) was dropwise added to the three-necked reaction flask by a constant pressure dropping funnel, where lithium hexafluorophosphate, oxalyl chloride and hexaethyldisiloxane had a molar ratio of 1:2:4.3; the mixture was stirred thoroughly for reaction, and the reaction was completed after 10 h to obtain a lithium difluorobis(oxalato)phosphate solution; and (2) the reaction solution was filtered, the filtrate was concentrated under reduced pressure, most of the solvent and triethylfluorosilane liquid and triethylchlorosilane liquid were removed, the obtained concentrated solution was added with 180 g of dichloromethane for crystallization, and filtered, the product was washed twice with 70 g of dichloromethane, and dried at 80° C. for 6 h under a relative vacuum of −0.09 MPa, and 23.20 g of the product lithium difluorobis(oxalato) phosphate (0.0921 mol) was obtained and the yield was 92.1%.

Example 5

This example provides a lithium difluorobis(oxalato) phosphate, and a method for preparing the lithium difluorobis(oxalato)phosphate is as follows:

(1) in a glovebox with nitrogen atmosphere and a moisture content less than 10 ppm, 250 g of dimethyl carbonate that was dehydrated to 5 ppm was added to a three-necked reaction flask, and 15.19 g of lithium hexafluorophosphate (0.1 mol) and 25.38 g of oxalyl chloride (0.2 mol) were simultaneously added; the three-necked reaction flask was taken out from the glovebox, placed on a constant temperature magnetic stirring device, and heated to 50° C.; 81.28 g of dichlorotetramethyldisiloxane (0.4 mol) was dropwise added to the three-necked reaction flask by a constant pressure dropping funnel, where lithium hexafluorophosphate, oxalyl chloride and dichlorotetramethyldisiloxane had a molar ratio of 1:2:4, the mixture was fully stirred for reaction, a dimethylfluorochlorosilane gas produced during the reaction was introduced into an alkali solution such as potassium hydroxide solution for absorption, the reaction was completed after 10 h to obtain a lithium difluorobis(oxalato)phosphate solution; and (2) the reaction solution was filtered, the filtrate was concentrated under reduced pressure, most of the solvent and dichlorodimethylsilane were removed, the obtained concentrated solution was added with 210 g of dichloromethane for crystallization, and filtered, the product was washed twice with 80 g of dichloromethane, and dried at 90° C. for 5 h under a relative vacuum of −0.09 MPa, and 23.05 g of the product lithium difluorobis(oxalato)phosphate (0.0915 mol) was obtained and the yield was 91.5%.

Example 6

The difference between this example and Example 1 is only that in step (1), an additive amount of the oxalyl chloride was 22.842 g (0.18 mol), and other conditions and parameters are exactly the same as Example 1.

Example 7

The difference between this example and Example 1 is only that in step (1), an additive amount of the oxalyl chloride was 31.725 g (0.25 mol), and other conditions and parameters are exactly the same as Example 1.

Example 8

The difference between this example and Example 1 is only that in step (1), an additive amount of the hexamethyldisiloxane was 61.7 g (0.38 mol), and other conditions and parameters are exactly the same as Example 1.

Example 9

The difference between this example and Example 1 is only that in step (1), an additive amount of the hexamethyldisiloxane was 77.94 g (0.48 mol), and other conditions and parameters are exactly the same as Example 1.

Example 10

The difference between this example and Example 1 is only that in step (1), a temperature of the reaction was 25° C., and other conditions and parameters are exactly the same as Example 1.

Example 11

The difference between this example and Example 1 is only that in step (1), a temperature of the reaction was 70° C., and other conditions and parameters are exactly the same as Example 1.

Example 12

The difference between this example and Example 1 is only that in step (2), 120 g of dichloromethane was added to the obtained concentrated solution for crystallization, and other conditions and parameters are exactly the same as Example 1.

Example 13

The difference between this example and Example 1 is only that in step (2), a temperature of the drying was 30° C., and other conditions and parameters are exactly the same as Example 1.

Example 14

The difference between this example and Example 1 is only that in step (2), a temperature of the drying was 130° C., and other conditions and parameters are exactly the same as Example 1.

Comparative Example 1

This comparative example provides a lithium difluorobis (oxalato)phosphate, and a method for preparing the lithium difluorobis(oxalato)phosphate is as follows:

(1) in a glovebox with nitrogen atmosphere and a moisture content less than 10 ppm, 250.0 g of dimethyl carbonate that was dehydrated to 6 ppm was added to a three-necked reaction flask, 18.02 g of oxalic acid (0.20 mol) was added, and then 32.3 g of hexamethyldisilazane (0.2 mol) was added and the mixture was stirred for 30 min to mix evenly; 50.0 g of dimethyl carbonate that was dehydrated to 6 ppm was added to a flask, 15.2 g of lithium hexafluorophosphate (0.1 mol) was added while stirring so that lithium hexafluorophosphate was fully dissolved, and a lithium hexafluorophosphate solution was prepared; the three-necked reaction flask was taken out from the glovebox, placed on a constant temperature magnetic stirring device, and heated to 60° C., and the lithium hexafluorophosphate solution in the flask was slowly dropwise added to the three-necked reaction flask by a constant pressure dropping funnel, the mixture was fully stirred for reaction, a gas produced during the reaction was introduced into an alkali solution such as potassium hydroxide solution for absorption, the reaction was completed after 6 h; and (2) the reaction solution was filtered, the filtrate was concentrated under reduced pressure, most of the solvent was removed, the obtained concentrated solution was added with 150 g of dichloromethane for crystallization, and filtered, the product was washed twice with 50 g of dichloromethane, and dried at 60° C. for 8 h under a relative vacuum of −0.09 MPa, and 22.43 g of the product lithium difluorobis(oxalato)phosphate (0.0890 mol) was obtained and the yield was 89.0%.

Performance Test

The performances of the lithium difluorobis(oxalato) phosphate obtained in Examples 1-14 and Comparative Example 1 were tested. The purity of the product was measured by an ion chromatograph (Type 930, made by Metrohm); the moisture content was measured by a moisture tester (Type 917, made by Metrohm); the acid value was measured by a potentiometric titrator (Type 888, made by Metrohm); the chloride ion content was measured by an ion chromatograph (Type 930, made by Metrohm); the metal impurity ion content was measured by an ICP-OES (Type PQ-9000, Made by Jena, Germany). Test results are shown in Table 1.

TABLE 1

| | Yield (%) | Purity (%) | Moisture (ppm) | Free acid (ppm) | Chloride ion content (ppm) | Metal impurity ion content (ppm) |
|---|---|---|---|---|---|---|
| Example 1 | 91.8 | 99.95 | 7.2 | 7.0 | 4.8 | 8.9 |
| Example 2 | 93.7 | 99.97 | 4.5 | 3.8 | 2.3 | 7.6 |
| Example 3 | 92.3 | 99.96 | 6.5 | 6.2 | 3.9 | 6.9 |
| Example 4 | 92.1 | 99.95 | 6.7 | 5.7 | 4.2 | 7.1 |
| Example 5 | 91.5 | 99.94 | 7.5 | 8.8 | 4.5 | 6.5 |
| Example 6 | 89.8 | 99.61 | 9.1 | 10.6 | 4.2 | 10.8 |
| Example 7 | 91.2 | 99.73 | 8.8 | 22.1 | 30.2 | 9.8 |
| Example 8 | 90.1 | 99.85 | 7.9 | 19.5 | 25.0 | 9.2 |
| Example 9 | 91.3 | 99.89 | 9.5 | 14.8 | 12.7 | 9.4 |
| Example 10 | 89.2 | 99.78 | 10.7 | 11.5 | 13.9 | 9.7 |
| Example 11 | 91.0 | 99.83 | 6.1 | 15.2 | 10.1 | 9.5 |
| Example 12 | 91.4 | 99.92 | 5.3 | 8.5 | 5.2 | 9.1 |
| Example 13 | 91.2 | 99.55 | 19.0 | 20.9 | 5.4 | 9.8 |
| Example 14 | 91.3 | 99.64 | 3.8 | 15.4 | 16.3 | 9.0 |
| Comparative Example 1 | 89.0 | 99.50 | 9.8 | 16.5 | 5.5 | 12.4 |

As can be seen from Table 1, it can be seen from Examples 1-14 that the yield of the lithium difluorobis (oxalato)phosphate prepared by the method of the present application can be more than or equal to 89.2%, the purity of the lithium difluorobis(oxalato)phosphate prepared by the method of the present application can be more than or equal to 99.55%, the moisture content of the product can be less than or equal to 19 ppm, the content of free acid can be less than or equal to 22.1 ppm, and the chloride ion content can be less than or equal to 30.2 ppm, and the metal impurity ion content be less than or equal to 10.8 ppm; by adjusting each component proportion and reaction conditions, the yield of the prepared lithium difluorobis(oxalato)phosphate can be more than or equal to 91.5%, the purity can be more than or equal to 99.94%, the moisture content of the product can less than or equal to 7.5 ppm, the content of free acid can be less than or equal to 8.8 ppm, and the chloride ion content can be less than or equal to 4.8 ppm, and the metal impurity ion content can be less than or equal to 8.9 ppm.

From the comparison of Example 1 and Examples 6-7, it can be seen that by controlling the ratio of lithium hexafluorophosphate and oxalyl chloride at 1:(2.0-2.4), the yield and purity of the prepared lithium difluorobis(oxalato)phosphate are high; if the ratio is less than 1:2, lithium hexafluorophosphate reacts incompletely, the high price of lithium hexafluorophosphate leads to high preparation cost, and lithium hexafluorophosphate is difficult to remove and may be decomposed to produce impurities; if the ratio is more than 1:2.4, the amount of oxalyl chloride is too much and difficult to remove, affecting the purity of the product.

From the comparison of Example 1 and Examples 8-9, it can be seen that by controlling the ratio of lithium hexafluorophosphate and siloxane at 1:(4.0-4.5), the yield and purity of the prepared lithium difluorobis(oxalato)phosphate are high; if the ratio is less than 1:4, lithium hexafluorophosphate and oxalyl chloride are excessive, the preparation cost increases and the purity of the product reduces; if the ratio is more than 1:4.5, siloxane is excessive, and the reaction yield does not further increase.

From the comparison of Example 1 and Examples 10-11, it can be seen that the reaction temperature in step (1) can affect the yield and purity of the prepared lithium difluorobis(oxalato)phosphate, and by controlling the reaction temperature at 30-60° C., the lithium difluorobis(oxalato)phosphate with high yield and purity can be prepared.

From the comparison of Example 1 and Example 12, it can be seen that the additive amount of the poor solvent can partially affect the yield and purity of the prepared lithium difluorobis(oxalato)phosphate, and by controlling the mass ratio of the poor solvent to the lithium hexafluorophosphate at (8-30):1, lithium difluorobis(oxalato)phosphate can be crystallized to the maximum extent while stabilizing the cost.

From the comparison of Example 1 and Examples 13-14, it can be seen that the drying temperature in step (1) can affect the yield and purity of the prepared lithium difluorobis(oxalato)phosphate, and by controlling the drying temperature at 40-120° C., the decomposition of lithium difluorobis(oxalato)phosphate can be avoided, and furthermore, residual raw materials, moisture and solvents can be removed.

From the comparison of Examples 1-5 and Comparative Example 1, it can be seen that the purity, moisture content, acid value, chloride ion content and metal impurity ion content of the lithium difluorobis(oxalato)phosphate prepared by the method of the present application are better than that of Comparative Example 1.

In the method for preparing lithium difluorobis(oxalato)phosphate of the present application, oxalyl chloride, lithium hexafluorophosphate and siloxane are used for reaction. Oxalyl chloride has a better reactivity, which is conducive to the reaction; because siloxane can bind strongly to fluorine atoms in lithium hexafluorophosphate, and provide oxygen atoms for the formation of lithium difluorobis(oxalato)phosphate without producing waste gas such as ammonia gas, and three wastes are less.

The preparation method of the present application has a simple and convenient operation, few reaction step, high conversion rate and little impurity, which avoids the defects of other methods such as complex operation and many impurities, and ensures the purity and quality of the product, and the method can obtain the high-quality and high-purity product, which is suitable for industrial mass production.

The applicant declares that the above is only the embodiments of the present application, but the protection scope of the present application is not limited to the above embodiments. It should be understood by those skilled in the art that any change or replacement that can be easily thought of, within the technical scope disclosed by those skilled in the art of the present application, falls within the protection scope and disclosure scope of the present application.

What is claimed is:

1. A method for preparing lithium difluorobis(oxalato)phosphate, comprising the following steps:

(1) mixing oxalyl chloride and lithium hexafluorophosphate with a nonaqueous solvent, adding siloxane, and reacting to obtain a lithium difluorobis(oxalato)phosphate solution; and (2) adding a poor solvent into the lithium difluorobis(oxalato)phosphate solution for crystallization to obtain the lithium difluorobis(oxalato)phosphate, wherein the poor solvent in step (2) is selected from a group consisting of n-hexane, dichloromethane, 1,2-dichloroethane, toluene, ethylbenzene, and any combinations thereof.

2. The preparation method according to claim 1, wherein the nonaqueous solvent in step (1) is selected from a group consisting of dimethyl carbonate, diethyl carbonate, methyl ethyl carbonate, ethylene glycol dimethyl ether, ethyl acetate, acetonitrile, and any combinations thereof.

3. The preparation method according to claim 1, wherein a purity of the nonaqueous solvent in step (1) is more than 99.9%.

4. The preparation method according to claim 1, wherein a moisture content of the nonaqueous solvent in step (1) is less than 10 ppm.

5. The preparation method according to claim 1, wherein the nonaqueous solvent to the lithium hexafluorophosphate in step (1) have a mass ratio of is 10:1 to 20:1.

6. The preparation method according to claim 1, wherein the siloxane is selected from a group consisting of hexamethyldisiloxane, hexaethyldisiloxane, difluorotetramethyldisiloxane, difluorotetraethyldisiloxane, dichlorotetramethyldisiloxane, dichlorotetraethyldisiloxane, and any combinations thereof.

7. The preparation method according to claim 1, wherein the reacting in step (1) comprises stirring.

8. The preparation method according to claim 1, wherein the lithium difluorobis(oxalato)phosphate solution is filtered after step (1) and before the crystallization in step (2).

9. The preparation method according to claim 1, wherein the lithium hexafluorophosphate, the oxalyl chloride and the siloxane in step (1) have a molar ratio between 1:2.0:4.0 and 1:2.4:4.5.

10. The preparation method according to claim 1, wherein a temperature of the reacting is 30-60° C.

11. The preparation method according to claim 1, wherein the mixing in step (1) is performed under an inert atmosphere.

12. The preparation method according to claim 1, wherein, the poor solvent to the lithium hexafluorophosphate have a mass ratio of between 8:1 and 30:1.

13. The preparation method according to claim 6, wherein the siloxane is added in manner of dropwise adding.

14. The preparation method according to claim 8, wherein filtration, washing, and drying are performed after step (2).

15. The preparation method according to claim 14, wherein the drying comprises vacuum drying.

16. The preparation method according to claim 14, wherein the drying comprises a parameter selected from a group consisting of a drying temperature between 40-120° C., a drying temperature between 60-100° C., a drying time between 2 and 12 hours, and a drying time between 4 and 8 hours.

17. The preparation method according to claim 10, wherein the reacting has a time of 6 to 12 hours.

18. The preparation method according to claim 11, wherein step (2) is performed under the inert atmosphere.

19. The preparation method according to claim 11, wherein the inert atmosphere comprises an element selected from a group consisting of nitrogen, helium, neon, argon, and any combinations thereof.

20. The preparation method according to claim 11, wherein the inert atmosphere comprises a moisture content of less than 10 ppm.

* * * * *